United States Patent
Li et al.

(10) Patent No.: US 8,385,643 B2
(45) Date of Patent: Feb. 26, 2013

(54) DETERMINATION OF INPUTTED IMAGE TO BE DOCUMENT OR NON-DOCUMENT

(75) Inventors: Jilin Li, Shanghai (CN); Zhi-Gang Fan, Shanghai (CN); Yadong Wu, Shanghai (CN); Bo Wu, Shanghai (CN); Ning Le, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 1080 days.

(21) Appl. No.: 12/353,440

(22) Filed: Jan. 14, 2009

(65) Prior Publication Data
US 2009/0245640 A1    Oct. 1, 2009

(30) Foreign Application Priority Data

Mar. 31, 2008  (CN) .......................... 2008 1 0090406

(51) Int. Cl.
*G06K 9/00* (2006.01)
*G06K 9/54* (2006.01)
*G06F 17/00* (2006.01)

(52) U.S. Cl. ........................ 382/170; 382/305; 715/200
(58) Field of Classification Search .................. 382/170, 382/305, 176; 358/462; 715/200
See application file for complete search history.

(56) References Cited

U.S. PATENT DOCUMENTS

| | | | |
|---|---|---|---|
| 5,465,304 A | 11/1995 | Cullen et al. | |
| 5,581,633 A * | 12/1996 | Hotta et al. | 382/171 |
| 5,588,072 A * | 12/1996 | Wang | 382/176 |
| 5,613,016 A * | 3/1997 | Saitoh | 382/174 |
| 5,860,075 A * | 1/1999 | Hashizume et al. | 715/210 |
| 5,933,823 A * | 8/1999 | Cullen et al. | 1/1 |
| 5,949,555 A * | 9/1999 | Sakai et al. | 358/462 |
| 5,987,171 A * | 11/1999 | Wang | 382/173 |
| 6,035,061 A * | 3/2000 | Katsuyama et al. | 382/177 |
| 6,173,073 B1 * | 1/2001 | Wang | 382/176 |
| 6,233,353 B1 * | 5/2001 | Danisewicz | 382/176 |
| 6,289,120 B1 * | 9/2001 | Yamaai et al. | 382/173 |
| 6,332,046 B1 * | 12/2001 | Fujimoto et al. | 382/289 |
| 6,563,949 B1 * | 5/2003 | Takebe | 382/190 |
| 7,013,309 B2 * | 3/2006 | Chakraborty et al. | 1/1 |
| 7,085,420 B2 | 8/2006 | Mehrotra | |
| 7,519,226 B2 * | 4/2009 | Kaneda et al. | 382/224 |
| 2002/0025072 A1 * | 2/2002 | Yamaai | 382/199 |
| 2004/0061883 A1 * | 4/2004 | Kanatsu | 358/1.9 |
| 2005/0180645 A1 * | 8/2005 | Hasegawa et al. | 382/239 |
| 2005/0195430 A1 | 9/2005 | Shinohara et al. | |

(Continued)

FOREIGN PATENT DOCUMENTS

| | | |
|---|---|---|
| CN | 1664829 A | 9/2005 |
| CN | 1760860 A | 4/2006 |

(Continued)

*Primary Examiner* — Wenpeng Chen
(74) *Attorney, Agent, or Firm* — Birch, Stewart, Kolasch & Birch, LLP

(57) ABSTRACT

A preprocessing section binarizes input image data and calculates a total black pixel ratio. A feature extracting section detects connected components included in the binary image data and detects circumscribing bounding boxes of the connected components. Predetermined connected components are removed from all of the connected components based on the sizes of the detected circumscribing bounding boxes and bounding box black pixel ratios. By using the connected components that remain after removing the unnecessary connected components, a histogram is generated by specifying the sizes of the circumscribing bounding boxes as classes and numbers of the connected components as the frequencies of occurrence. A determining section determines whether the input image data is document image data or non-document image data based on information related to the generated histogram and the total black pixel ratio.

10 Claims, 8 Drawing Sheets

U.S. PATENT DOCUMENTS

| | | |
|---|---|---|
| 2006/0082595 A1 | 4/2006 | Liu et al. |
| 2006/0215230 A1* | 9/2006 | Borrey et al. ................. 358/448 |
| 2006/0288278 A1* | 12/2006 | Kobayashi .................... 715/523 |
| 2007/0140560 A1* | 6/2007 | Katsuyama et al. ........... 382/176 |
| 2008/0056576 A1* | 3/2008 | Takebe et al. ................. 382/180 |
| 2008/0177764 A1 | 7/2008 | Kise et al. |
| 2011/0043869 A1* | 2/2011 | Okajo ........................... 358/474 |

FOREIGN PATENT DOCUMENTS

| | | |
|---|---|---|
| JP | 4-309191 A | 10/1992 |
| JP | 05282492 A * | 10/1993 |
| JP | 08-022507 A | 1/1996 |
| JP | 11066230 A * | 3/1999 |
| WO | WO 2006/092957 A1 | 9/2006 |

* cited by examiner

DETERMINATION OF INPUTTED IMAGE TO BE DOCUMENT OR NON-DOCUMENT

CROSS-REFERENCE TO RELATED APPLICATION

This application claims priority to Chinese Patent Application No. 200810090406.8, which was filed on Mar. 31, 2008, the contents of which are incorporated herein by reference in its entirety.

BACKGROUND OF THE INVENTION

1. Field of the Invention

The present invention relates to an image determination apparatus for determining whether inputted image data is document image data or non-document image data, an image search apparatus having the image determination apparatus and a recording medium on which an image search program is recorded.

2. Description of the Related Art

There are image forming apparatuses such as a copy machine, a facsimile machine, a printer, and a multifunctional peripheral having multiple functions thereof, which have functions of storing image data such as an inputted document image in a mass-capacity storage device and reading out and reprinting registered image data that has been inputted once at any time.

The function of reprinting is convenient. However, as an amount of the registered data increases, it is difficult to find data to be outputted. Accordingly, image search technology for searching desired image data from a plurality of pieces of image data becomes important.

In order to search image data, similarity between the registered image data and inputted image data needs to be calculated by comparing the registered image data with the inputted image data. Here, document image data and non-document image data (pictures, figures, illustrations, and the like) included in the registered image data are generally mixed with each other.

According to a known technique, for example, an image search apparatus disclosed in Chinese Patent Application No. 200510005334.9, has a function of calculating a feature for the two-types of image data, that is, the document image data and the non-document image data by using the same algorithm, and does not have a processing step of discriminating between the document image data and the non-document image data or the like.

Meanwhile, as a technique applied to the discrimination between the image data, there is a region segmentation technique. The region segmentation technique has processing steps performed in advance in order to, for example, segment a piece of image data into a plurality of regions including a text region, a photograph region, a halftone region, a page background region, and the like and perform proper processing (filtering, halftoning, and the like) on the regions.

Such image segmentation techniques are disclosed in US Patent Publication U.S. Pat. No. 5,465,304A, US Patent Publication U.S. Pat. No. 7,085,420B2, Chinese Patent Application No. 200510063768.4, and the like.

In particular, a region attribute determination apparatus disclosed in Japanese Unexamined Patent Publication JP-A 4-309191 detects a position of connection between black runs, and when the connection therebetween is terminated, detects a circumscribing bounding box of a group of black pixels. The region attribute determination apparatus then generates a histogram using the heights or the widths of the circumscribing bounding boxes as a frequency of occurrence. In addition, the region attribute determination apparatus determines a region having small circumscribing bounding boxes of which the frequency of occurrence is greater than or equal to a threshold value as the photograph region, and, based on a standard deviation of the histogram, determines a region having a histogram showing relatively uniform frequencies of occurrence as the text region, and determines a region having a histogram showing relatively uneven frequencies of occurrence as the figure region.

According to the known technique, since the same algorithm is used for both types of the image data, that is, the document image data and the non-document image data to calculate the feature, search accuracy cannot be high enough. Specifically, in the search process, the inputted data needs to be compared to all of the registered image data. Therefore, as a greater amount of the registered image data exists, more time is needed for the search process.

In addition, in terms of determination accuracy for either the discrimination between the document image data or the non-document image data, high enough accuracy cannot be obtained by using the known technique.

SUMMARY OF THE INVENTION

An object of the invention is to provide an image determination apparatus capable of improving determination accuracy. Another object of the invention is to provide an image search apparatus capable of improving determination accuracy in addition to reducing time needed to perform a search process and a recording medium on which an image search program is recorded.

The invention provides an image determination apparatus which determines whether inputted image data is document image data or non-document data, comprising:

a binarization process section which converts the inputted image data to binary image data by binarizing the inputted image data, and calculates a total black pixel ratio that is a ratio of a number of black pixels to a number of all pixels in the image data;

a feature extracting section which detects connected components that are groups of pixels having a same color in the binary image data and circumscribing bounding boxes of the connected components, and generates a histogram by specifying the sizes of the circumscribing bounding boxes as classes and numbers of the connected components as frequencies of occurrence; and an image determination section which determines whether the inputted image data is document image data or non-document image data based on information related to the generated histogram and the total black pixel ratio.

According to the invention, the binarization process section first binarizes the inputted image data, and generates the total black pixel ratio.

The feature extracting section detects the connected components that are the groups of adjacent pixels having the same colors in the binary image data and detects the circumscribing bounding boxes of the connected components. In addition, the feature extracting section generates the histogram by specifying the sizes of the circumscribing bounding boxes as the classes and the numbers of connected components as the frequencies of occurrence.

The image determination section determines whether the inputted image data is the document image data or the non-document image data based on the information related to the generated histogram and the total black pixel ratio.

Since the determination is based on the information related to the histogram and the total black pixel ratio, time needed to perform the determination can be reduced, and determination accuracy can be improved.

Moreover, in the invention, it is preferable that the feature extracting section removes the connected components in the circumscribing bounding boxes of which the sizes are smaller than a predetermined size, from all connected components, further removes the connected components in the circumscribing bounding boxes of which the bounding box black pixel ratios are out of a predetermined range, based on the sizes of the circumscribing bounding boxes and bounding box black pixel ratios each of which represents a ratio of the number of the black pixels constituting the corresponding connected component in the corresponding circumscribing bounding box to the number of all pixels in the corresponding circumscribing bounding box, and generates the histogram by using the remaining connected components.

According to the invention, the feature extracting section, in the first step, removes the connected components in the circumscribing bounding boxes of which the sizes are smaller than the predetermined size, and in the second step, removes the connected components in the circumscribing bounding boxes of which the bounding box black pixel ratios are out of the predetermined range. The feature extracting section generates the histogram by using the connected components that remain after removing the unnecessary connected components.

When the sizes of the circumscribing bounding boxes are extremely small, the corresponding circumscribing bounding boxes may represent dots or ruled lines and hardly affect the determination accuracy in the determination between the document image data and the non-document image data. Therefore, by removing the corresponding bounding boxes in advance, an amount of calculation for generating the histogram can be reduced.

The circumscribing bounding box having an extremely great bounding box black pixel ratio may represent, for example, an ink smudge. When simple smudges are not removed in advance and the smudges are similar to the circumscribing bounding boxes of texts, even though the smudges are not the texts, the smudges may cause the data including the smudges to be determined as the document image data. When the smudges are similar to the circumscribing bounding boxes of figures, even though the smudges are not the figures, the smudges may cause the data including the smudges to be determined as the non-document image data. Accordingly, it may cause a faulty determination and a reduction in the determination accuracy.

By removing the unnecessary connected components as described above, the amount of calculation for processing the histogram can be reduced, and the determination accuracy can be improved.

Moreover, in the invention, it is preferable that when the number of the connected components in the circumscribing bounding boxes which belong to a class representing the smallest size is assumed to be r1, a ratio of the number r1 of the connected components to the number of all connected components is assumed to be r2, and the total black pixel ratio is assumed to be r0, the image determination section calculates a determination feature F by using $F=r1 \times r2/r0$ and determines whether the inputted image data is the document image data or the non-document image data based on the determination feature F.

According to the invention, since the histogram of the document image data shows a significant peak for the number of the connected components in the circumscribing bounding boxes which belong to a class representing the smallest size, r1 and r2 have relatively greater values. In addition, since the total number of black pixels is small, r0 is small. Therefore, F tends to have a greater value. On the contrary, since the histogram of the non-document image data has uniform numbers of connected components at each of the classes and does not show a significant peak, r1 and r2 have relatively smaller values. In addition, since the total number of black pixels is great, r0 is great. Therefore, F tends to have a smaller value. The determination accuracy can be improved by the use of the determination feature F for the determination.

Moreover, the invention provides an image search apparatus which searches pre-registered image data for image data similar to inputted image data, comprising:

the image determination apparatus mentioned above;

a feature data generating section which generates feature data for document image data when the inputted image data is the document image data and generates feature data for non-document image data when the inputted image data is the non-document image data based on the determination result of the image determination apparatus;

a search section which searches the pre-registered image data for the image data similar to the inputted image data, based on feature data of the pre-registered image data and the feature data generated by the feature data generating section; and a display section which displays the image data similar to the inputted image data among the pre-registered image data based on the search result of the search section.

According to the invention, the feature data generating section generates the feature data for the document image data when the inputted image data is the document image data and generates the feature data for the non-document image data when the inputted image data is the non-document image data, based on the determination result of the image determination apparatus. In addition, when the search section searches for the image data similar to the inputted image data based on the feature data of the pre-registered image data and the feature data generated by the feature data generating section, the display section displays the image data similar to the inputted image data among the pre-registered image data.

Whether the inputted image data is the document image data or the non-document image data is determined before performing the search process, so that a proper feature can be calculated, and search accuracy can be improved.

Moreover, in the invention, it is preferable that the pre-registered image data is classified and registered into the document image data and the non-document image data, and based on the determination result of the image determination apparatus, when the inputted image data is the document image data, the search section sets a search field to the image data registered as the document image data, and when the inputted image data is the non-document image data, the search section sets the search field to the image data registered as the non-document image data.

According to the invention, when the inputted data is the document image data, the search field is set to the image data registered as the document image data, and when the inputted data is the non-document image data, the search field is set to the image data registered as the non-document image data.

Accordingly, the number of pieces of image data that is used to be compared to the feature by the search section can be limited, so that time required for performing the search process can be reduced.

Moreover, the invention may provide the image search program to make a computer function as an image search apparatus.

Moreover, the invention provides a computer-readable recording medium on which an image search program is recorded in order to make a computer function as the image search apparatus mentioned above.

According to the invention, it is possible to provide an image search program and a computer-readable recording medium on which an image search program is recorded.

BRIEF DESCRIPTION OF DRAWINGS

Other and further objects, features, and advantages of the invention will be more explicit from the following detailed description taken with reference to the drawings wherein.

DETAILED DESCRIPTION

Figure 1:
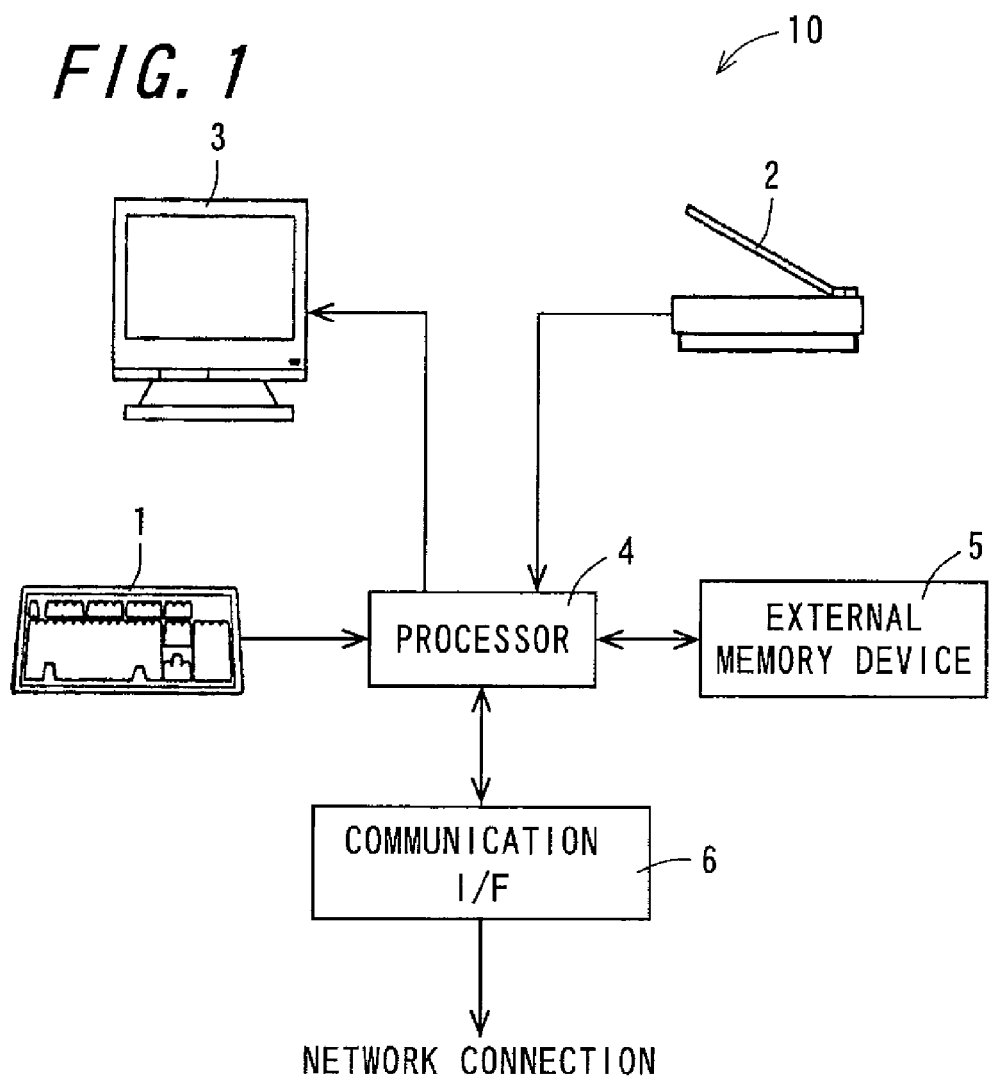
FIG. 1 is a block diagram illustrating a mechanical configuration of an image search apparatus.

Now referring to the drawings, preferred embodiments of the invention are described below.

FIG. 1 is a block diagram illustrating a mechanical configuration of an image search apparatus 10. The image search apparatus 10 includes a processor 4, and an external memory device 5 for storing software and the like used by the processor 4 to perform a practical process.

The processor 4 performs a determination process for determining whether image data that is inputted (hereinafter, referred to as "input image data") is document image data or non-document image data, compares the input image data to a plurality of pieces of image data that are registered in advance (hereinafter, referred to as "registration image data") based on the determination result, and practically performs an image search process for searching for and displaying the registration image data that is similar to the input image data. The practical processes of the processor 4 are performed by the software stored in the external memory device 5. The processor 4 may be configured in, for example, a general computer main body.

The external memory device 5 may be configured as, for example, a fast access hard disk. In addition, the external memory device 5 may have a configuration using a mass-capacity device such as an optical disk and the like to maintain a large amount of the registration image data. During the determination process and the search process, temporary data and the like created in each processing step may be stored in the external memory device 5 or a semiconductor memory that is embedded in the processor 4.

To the image search apparatus 10, a keyboard 1 and a display device 3 are connected. The keyboard 1 is used for inputting instructions for executing various software programs.

The display device 3 displays an image based on the input image data and the registration image data, search results, and the like.

To the image search apparatus 10, an image scanner 2 is additionally connected. The image scanner 2 is used for reading a document on which an image is printed and inputting the input image data.

The input image data can be acquired by using another device on a network through a communication I/F (interface) 6 in data communications, in addition to the image scanner 2. The communication I/F 6 is implemented as a LAN (Local Area Network) card used for connection to the LAN, a modem card connected to a public switched telephone network for data communications, or the like.

Figure 2:
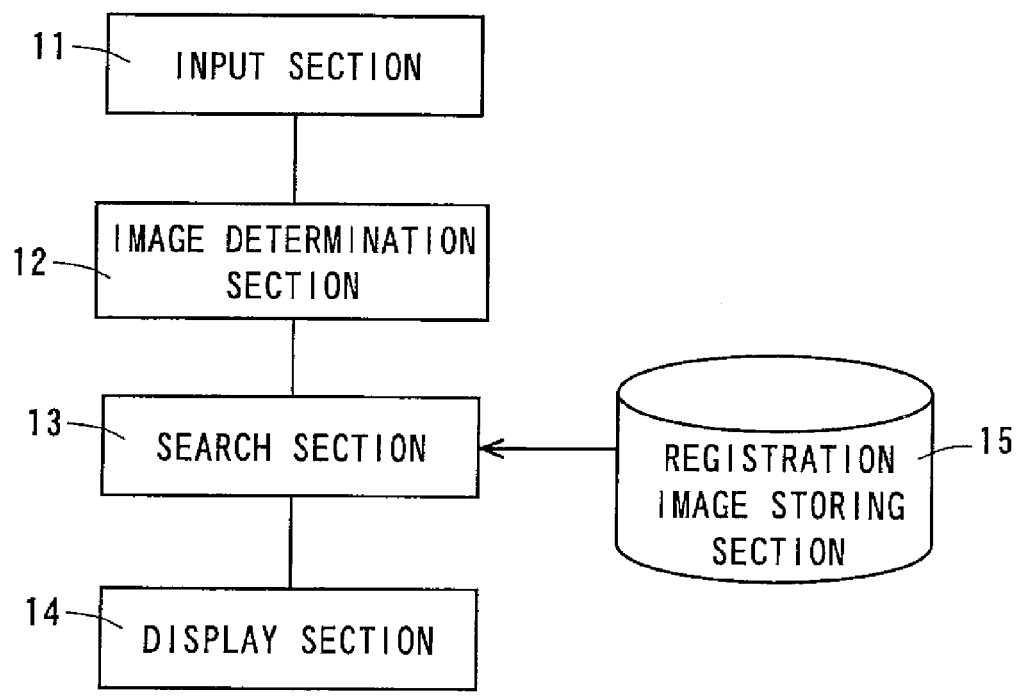
FIG. 2 is a block diagram illustrating a functional configuration of the image search apparatus.

FIG. 2 is a block diagram illustrating a functional configuration of the image search apparatus 10.

The image search apparatus 10 includes an input section 11, an image determination section 12, a search section 13, a display section 14, and a registration image storing section 15.

The input section 11 inputs the input image data and the registration image data. In the hardware configuration illustrated in FIG. 1, the image scanner 2, the communication I/F 6, and the like functionally correspond to the input section 11. The registration image data is image data that has been inputted in advance before the input image data is inputted and is stored in the registration image storing section 15.

Figure 3:
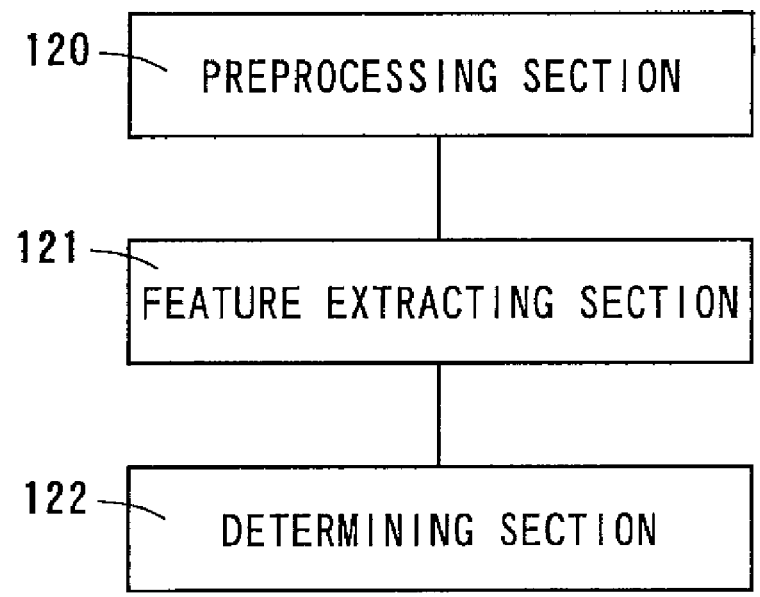
FIG. 3 is a block diagram illustrating a functional configuration of an image determination section.

FIG. 3 is a block diagram illustrating a functional configuration of the image determination section 12.

The image determination section 12 includes a preprocessing section 120, a feature extracting section 121, and a determining section 122.

The image determination section 12 determines whether the image data inputted by the input section 11 is the document image data or the non-document image data and outputs the determination result to the subsequent search section 13. The search section 13 changes a feature needed for the search process according to whether the input image data is the document image data or the non-document image data and calculate the feature proper for the image data.

Figure 4:
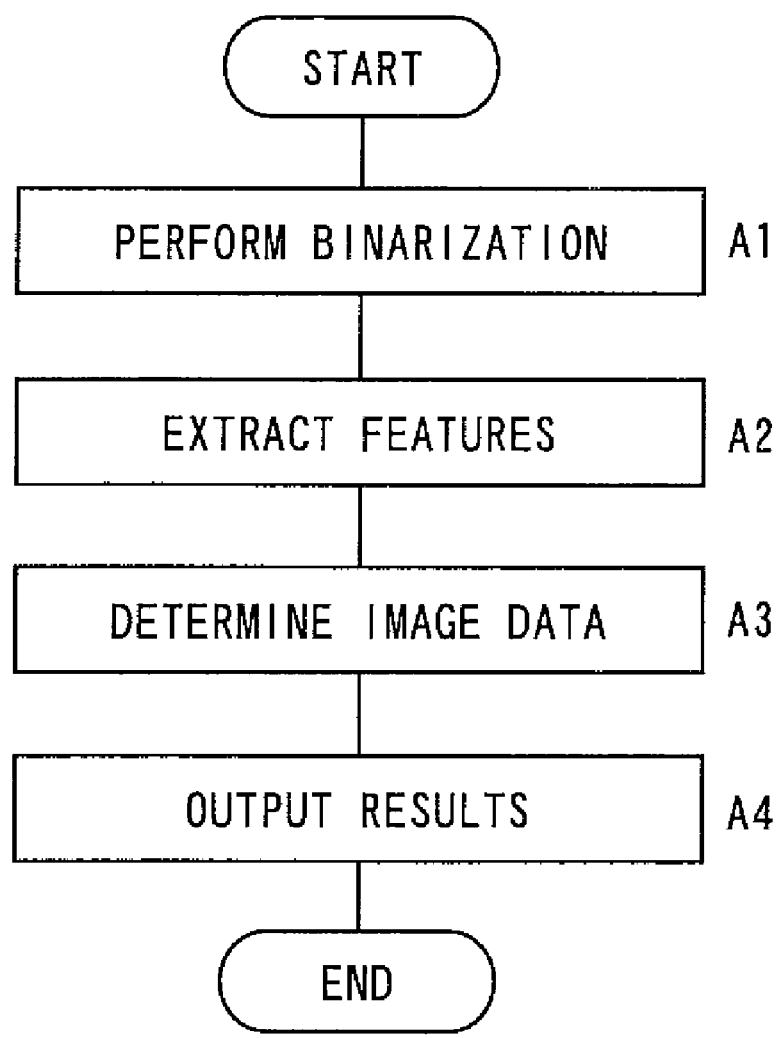
FIG. 4 is a flowchart illustrating a determination process performed by the image determination section.

FIG. 4 is a flowchart illustrating the determination process performed by the image determination section 12. In Step A1, the preprocessing section 120 performs a binarization process as a preprocess for the input image data. In Step A2, based on the binarized image data, the feature extracting section 121 detects a circumscribing bounding box of adjacent pixels and performs a statistical process (generation of a histogram) on the circumscribing bounding boxes. In Step A3, the determining section 122 determines whether the input image data is the document image data or the non-document image data based on the result of the statistical process and in Step A4, outputs the determination result to the search section 13.

Now, each step will be described in detail.

Figure 5:
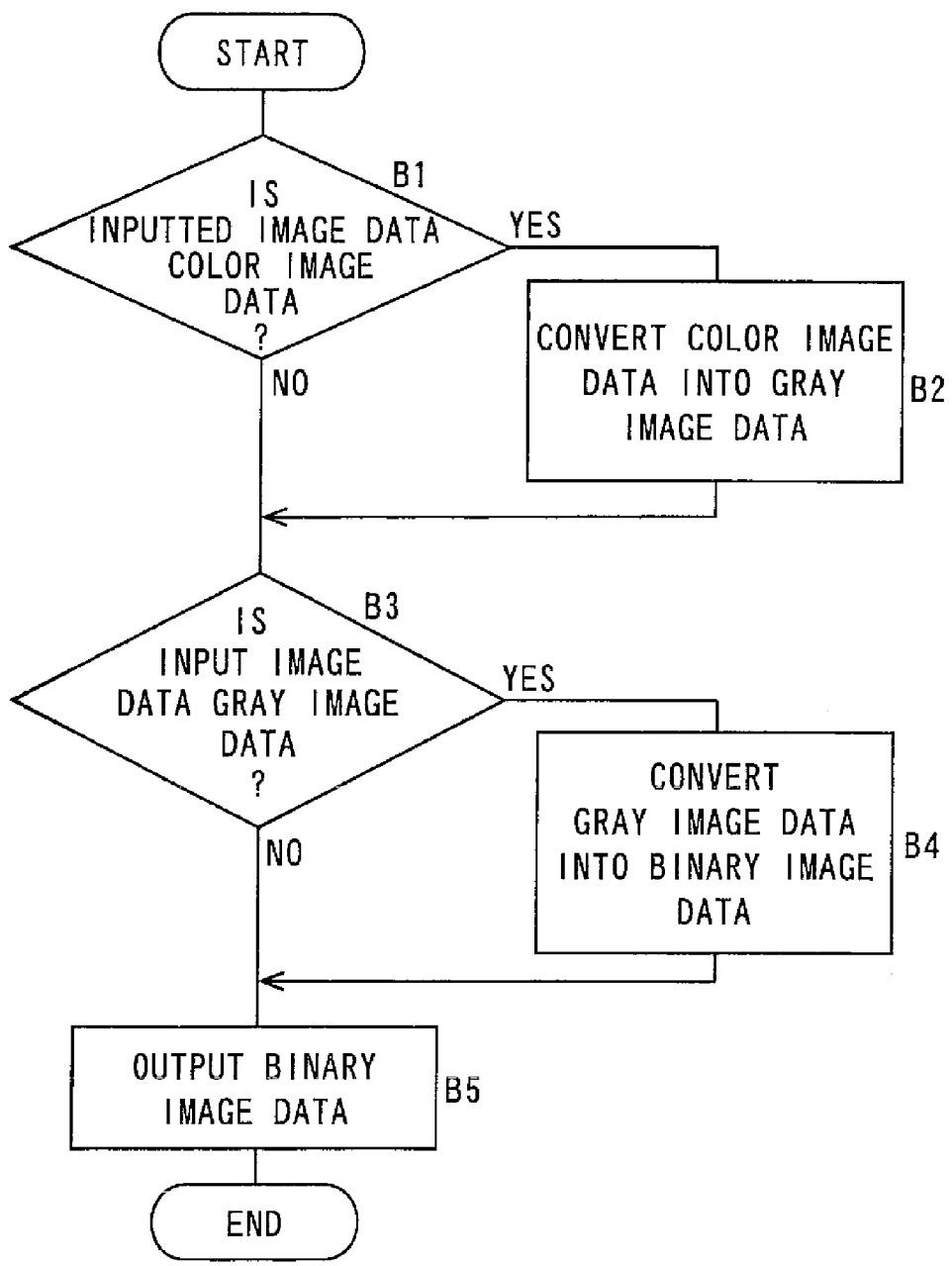
FIG. 5 is a flowchart illustrating a preprocess performed by a preprocessing section.

The preprocess of Step A1 performed by the preprocessing section 120 is illustrated, for example, in a flowchart of FIG. 5.

When image data is inputted, in Step B1, it is determined whether or not the input image data is color image data. When the input image data is the color image data, the process proceeds to Step B2 and the color image data is converted into gray image data by performing gray processing based on lightness components. When the input image data is not the color image data, the process proceeds to Step B3 and whether or not the input image data is the gray image data is determined. When the input image data is the gray image data, the process proceeds to Step B4 and the gray image data is binarized by using a predetermined threshold value and the gray image data is converted into binary image data. Then, the process proceeds to step B5 and the binary image data is outputted, and then the process is ended. When the input image data is not the gray image data, it means that the input image data is binary image data. Therefore, the process proceeds to step B5 and the binary image data is outputted, and then the process is ended.

Binary image data is so-called black-and-white image data that is image data of which each pixel value is 0 or 1 (white pixel or black pixel). All pixels of the gray image data are classified into black pixels and white pixels by performing threshold processing on a gray level (density) of each pixel in the gray image data.

In addition, in Step B4, a total black pixel ratio of the number of black pixels to the total number of pixels constituting image data to be determined is calculated.

Figure 6:
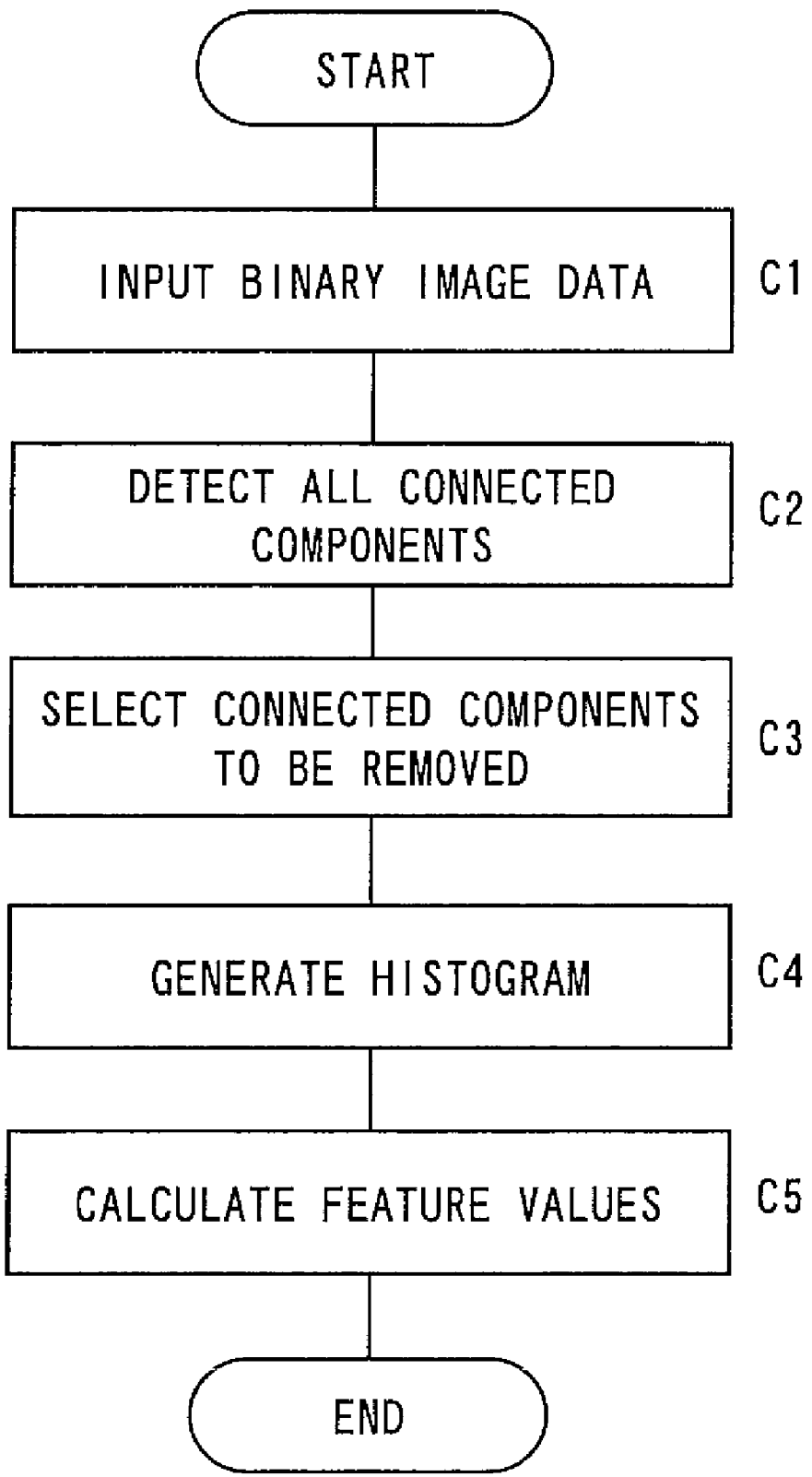
FIG. 6 is a flowchart illustrating feature extracting process performed by the feature extracting section.

Feature extracting process performed by the feature extracting section 121 in Step A2 is illustrated, for example, in a flowchart of FIG. 6.

When the binary image data binarized by the preprocessing section 120 is inputted in Step C1, all the connected components are detected from the binary image data in Step C2.

The connected component refers to as a group of pixels that are connected and have the same color. Connected components of black pixels or white pixels are detected depending on whether a page background of the input image data has a black pixel or a white pixel. Generally, the page background frequently has white pixels and a text or figure image is illustrated by black pixels, and therefore, in the embodiment, the case of detecting the connected component of the black pixels is described. When the page background has black pixels, it means that a white text or a white figure is illustrated by white pixels in a text image or a figure image. In this case, the connected component of the white pixel is detected.

In addition, whether the page background has black pixels or white pixels can be determined by performing a well-known page background determination process. For example, when the total black pixel ratio is smaller than a predetermined ratio, it is determined that the page background has white pixels, and when the total black pixel ratio is greater than the predetermined ratio, it is determined that the page background has black pixels.

The connected component can be detected by using a well-known detection method. For example, for a line, a continuous part of adjacent black pixels (black run) is detected from the line, a run length of the black run and coordinates of black pixels of both ends of the black run are stored. The coordinates are defined in advance, for example, by specifying a direction parallel to the line as the x-axis and a direction perpendicular to the line as the y-axis.

For black runs of upper and lower lines with a target line interposed therebetween in the y-direction, when the x-coordinates of both ends of the black pixels fall in the range of the x-coordinates of both ends of a black run of the target line, it can be regarded that the black run of the target line and the black runs having both ends of which the x-coordinates of the black pixels fall in the range thereof, are connected in the y-direction.

In this manner, lines are sequentially determined as target lines to detect continuous parts in the x and y-directions for all of the image data to detect connected components of black pixels.

When the connected components of the black pixels are detected, a circumscribing bounding box of each detected connected component is generated. The circumscribing bounding box is a bounding box having sides parallel to the x-axis and sides parallel to the y-axis. Here, the length of the side in the x-axis is referred to as the width of the bounding box, and the length of the side in the y-direction is referred to as the height of the bounding box.

The circumscribing bounding box can be generated by using a known generation method. For example, when the connected components are detected, the coordinates of black pixels at both ends of each black run are detected in advance, for each of all black runs, and therefore a minimum value and a maximum value of an x-coordinate are extracted, and a difference between the maximum value and the minimum value is calculated as a width of a bounding box (the number of pixels). In addition, for all of black runs constituting a connected component, a minimum value and a maximum value of a y-coordinate are extracted, and a difference between the maximum value and the minimum value is calculated as a height of the bounding box (the number of pixels).

In addition, according to the invention, for every connected component, a bounding box black pixel ratio of black pixels to all pixels in a circumscribing bounding box is calculated. As described above, since the width and the height of the bounding box that is the size information on the circumscribing bounding box is calculated in advance, the number of pixels in the circumscribing bounding box can be calculated by using those values, and the number of the black pixels can be calculated by using the sum of the run lengths of the pixels constituting the connected component.

Accordingly, the bounding box black pixel ratio can be calculated by using an expression of (the number of black pixels constituting a connected component)/(the number of all pixels in a circumscribing bounding box).

In this manner, in Step C2, for each connected component in the binary image data, points (coordinates) of black pixels constituting the connected components, points (coordinates) of circumscribing bounding boxes, widths of the circumscribing bounding boxes, heights of the circumscribing bounding boxes, and bounding box black pixel ratios, are stored in a predetermined storage region in association with the corresponding connected component.

Next, in Step C3, selection of the connected components is performed before performing the statistical process. Here, an object of the selection is to remove the connected components that are not used for the statistical process. The selection in Step C3, that is, removal of unnecessary connected components includes two steps.

The selection in the first step is selection based on sizes of circumscribing bounding boxes.

A threshold (for example, 0.4) for the widths and the heights of the circumscribing bounding boxes is set, and the threshold is compared with the width and the height of the circumscribing bounding box. When one or more of the width and the height are smaller than the threshold, the connected component of the circumscribing bounding box is removed.

A circumscribing bounding box having an extremely small width or height may frequently represent a dot or a ruled line and hardly affects determination accuracy in discrimination between document image data and non-document image data. Therefore, by removing the unnecessary circumscribing bounding boxes in advance, an amount of calculation for the statistical process can be reduced.

The selection in the second step is selection based on the bounding box black pixel ratios.

A predetermined range (for example, 0.05 to 0.08) for the bounding box black pixel ratios is set, and the bounding box black pixel ratios are compared to the predetermined range. When the bounding box black pixel ratio is out of the predetermined range, connected components of the corresponding circumscribing bounding box are removed.

The circumscribing bounding box having an extremely small bounding box black pixel ratio may represent, for example, a hatched ruled line or the like and hardly affects the determination accuracy. Therefore, by removing the corresponding circumscribing bounding boxes in advance, an amount of calculation for the subsequent statistical process can be reduced.

The circumscribing bounding box having an extremely great bounding box black pixel ratio may represent, for example, an ink smudge. When simple smudges are not removed in advance and the smudges are similar to the circumscribing bounding boxes of texts, even though the smudges are not the texts, the smudges may cause the data including the smudges to be determined as the document image data. When the smudges are similar to the circumscribing bounding boxes of figures, even though the smudges are not the figures, the smudges may cause the data including the smudges to be determined as the non-document image data. Accordingly, it may cause a misjudgment and a reduction in the determination accuracy.

By performing the selection based on the bounding box black pixel ratios, the amount of calculation for the subsequent statistical process can be reduced, and the determination accuracy can be improved.

In this manner, in Step C3, the two steps of selection are performed, unnecessary connected components are removed before the statistical process in advance, and only connected components that remain after the selection are used for the statistical process.

In Step C4, the statistical process is performed by using the connected components remaining after the selection.

The statistical process is, specifically, generating a histogram. Since all connected components have size information including widths and heights of circumscribing bounding boxes, the histogram is generated by using the size information.

Here, the histogram is generated by specifying the sizes (widths or heights) of the circumscribing bounding boxes as classes and the numbers of the connected components included in the corresponding classes as frequencies of occurrence.

The classes of the generated histogram are determined by using the widths W or the heights H of the entire image data. When the number of the classes is assumed to be N, a connected component included in a bounding box having a width of less than $1 \times W/N$ is included in a first class to increase the corresponding frequency of occurrence by 1. Therefore, connected components in circumscribing bounding boxes having widths in the range of $k \times W/N$ to $(k+1) \times W/N$ are included in a k-th class to increase the corresponding frequencies of occurrence by the number of the connected components.

Figure 7A:
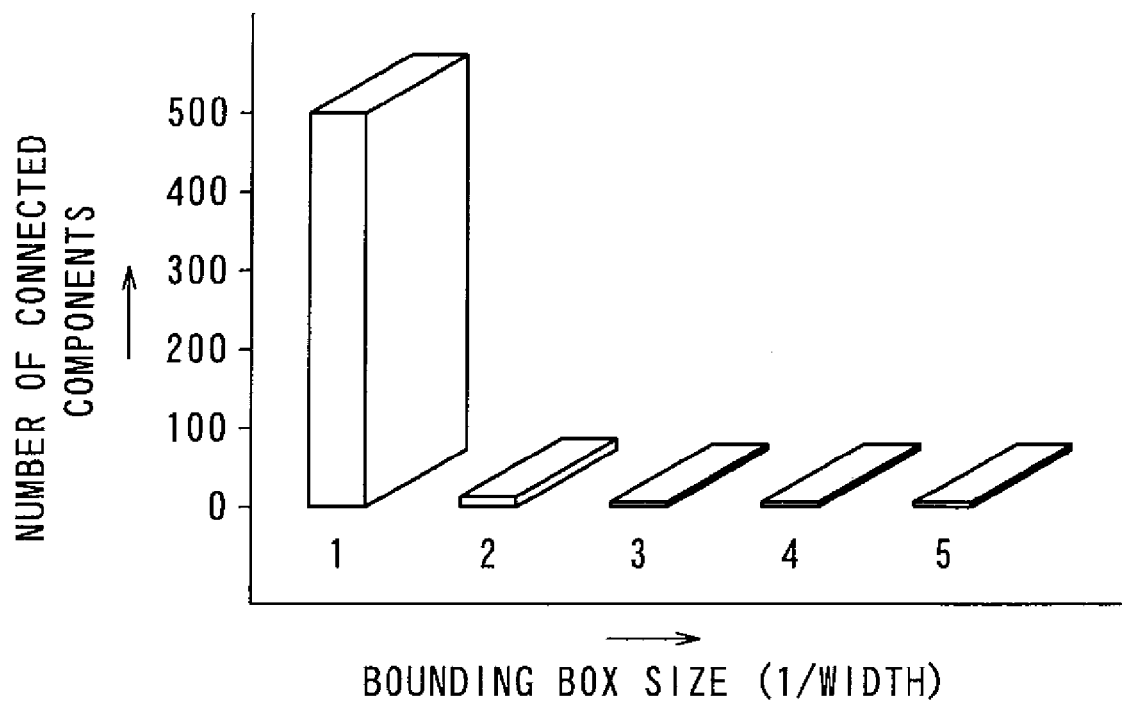
FIG. 7A and FIG. 7B are graphs displaying histograms.
Figure 7B:
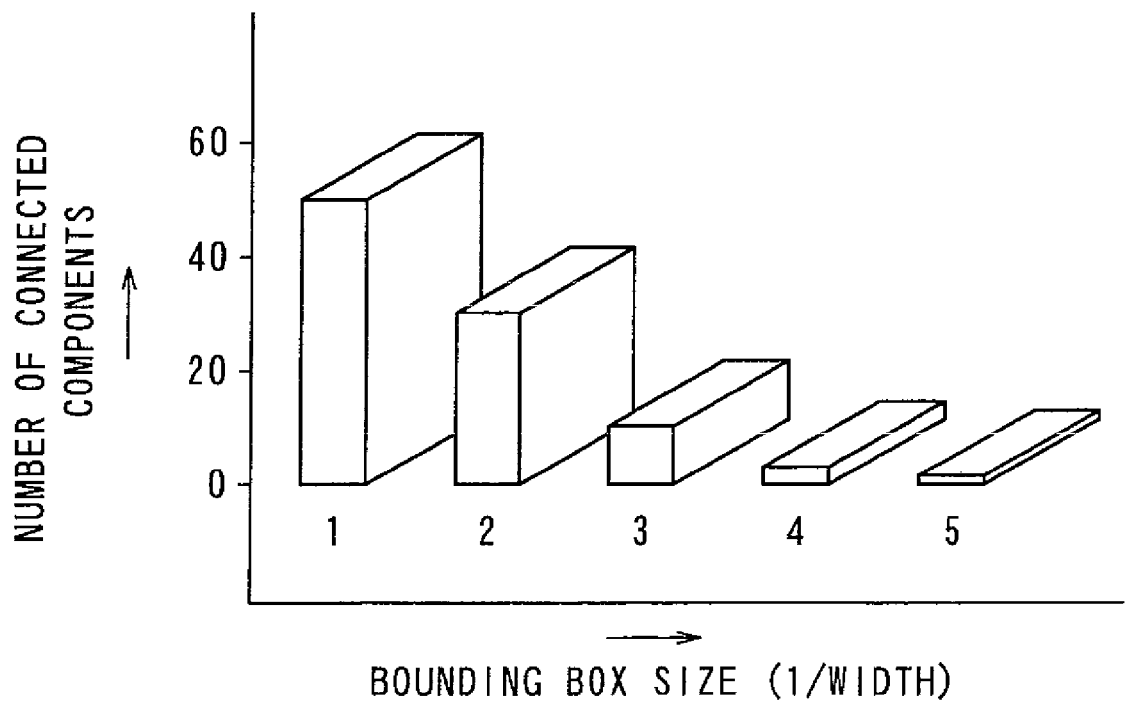

When the generated histogram is displayed as a graph, for example, as illustrated in FIGS. 7A and 7B, a frequency-of-occurrence distribution graph of which the horizontal and vertical axes represent sizes and the numbers of the connected components, respectively, is provided.

FIG. 7A illustrates an example of a histogram of the document image data, and FIG. 7B illustrates an example of a histogram of the non-document image data. When the connected components are texts, the corresponding circumscribing bounding boxes having the connected components are similar to squares, and many connected components having the same size exist. Therefore, in this histogram, the number of connected components that belong to a class representing a relatively smaller size shows a significant peak. In addition, when the connected components are not texts, the corresponding circumscribing bounding boxes having the connected components represent dot shapes, line shapes, block shapes, and the like. In addition, neither the shapes nor the sizes have uniformity. Therefore, in this histogram, the numbers of the connected components of classes are similar, and a significant peak cannot be seen.

In addition, according to the invention, even when the histogram is not displayed as the graph, the subsequent process can be performed. However, the display section 14 may be constructed to display the graph of the histogram.

The determining section 122 may determine whether the input image data is document image data or non-document image data based on features of the histogram.

In step C5, the feature extracting section 121 calculates a determination feature F as a feature value based on the histogram.

Information that is related to the histogram outputted from the feature extracting section 121 to the determining section 122 includes, for example, the total black pixel ratio $r0$, the number $r1$ of the connected components in the first class, a ratio $r2$ of the number of the connected components in the first class to the number of all connected components, and a feature F (a determination feature) used for the determination process. The determination feature F is calculated by using $F = r1 \times r2/r0$.

As the features of the histogram, since the number of the connected components at the first class shows a significant peak in the document image data, $r1$ and $r2$ have relatively greater values. In addition, since the total number of the black pixels is small, $r0$ is small. Therefore, F tends to have a greater value.

On the contrary, since the non-document pixel data has similar numbers of connected components of classes and does not have a significant peak, $r1$ and $r2$ have relatively smaller values. In addition, since the total number of the black pixels is great, $r0$ is great. Therefore, F tends to have a smaller value.

Figure 8:
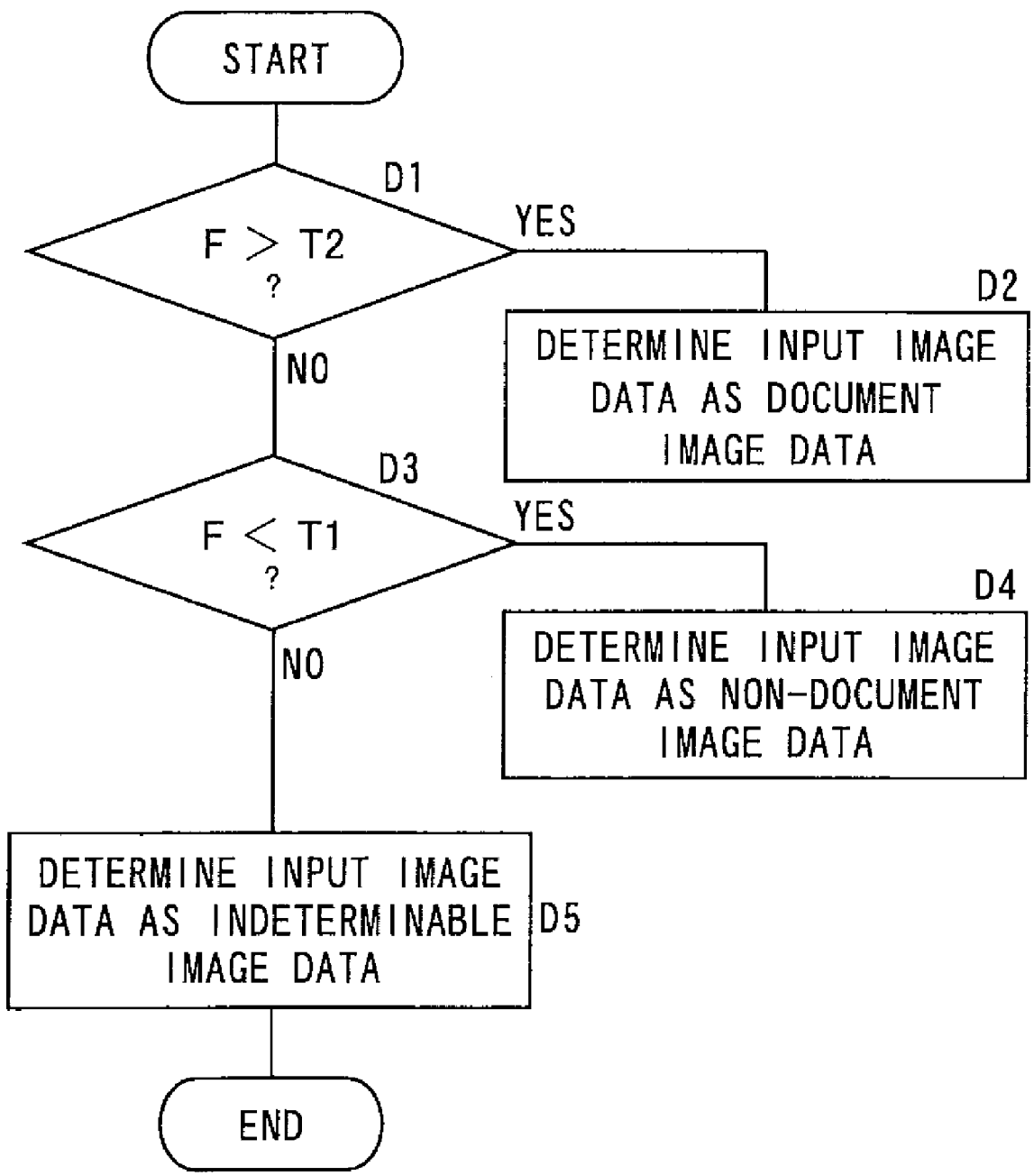
FIG. 8 is a flowchart illustrating a determination process performed by a determining section.

The determination process performed by the determining section 122 in Step A3 is illustrated, for example, in a flowchart of FIG. 8. In the determination process, threshold processing is performed by comparing the determination feature F to two thresholds TH1 and TH2 (>TH1).

When the determination feature F is inputted as the information related to the histogram generated by the feature extracting section 121, in Step D1, F is compared to TH2 and whether or not F is greater than TH2 is determined. When F is greater than TH2, in Step D2, the input image data is determined as the document image data. When F is equal to or smaller than TH2, in Step D3, F is compared to TH1 and whether or not F is smaller than TH1 us determined. When F is smaller than TH1, in Step D4, the input image data is determined as the non-document image data. When F is equal to or greater than TH1, that is, when F is a value between TH 1 and TH2, the input image data is determined as the image data as the indeterminable image in Step D5, that is, the input image data being impossible to be determined.

In an output process performed by the determining section 122 in Step A4, the determination result in Step A3 is outputted to the search section 13.

In order to use the input image data for searching, the search section 13 generates feature data of the input image data so as to be used for searching and compares the generated feature data to feature data of the registration image data. Since a type of feature data of document image data to be used as input image data is different from that of non-document image data to be used as input image data, proper feature data needs to be generated based on the determination result input from the image determination section 12.

Examples of the feature data of the document image data may include text data obtained by performing text recognition on the document image data. As the feature data of the non-document image data, for example, when the non-document image data is a gray image data, a luminance histogram obtained by performing a histogram generation process may be used. When the non-document image data is a color image data, a color luminance histogram obtained by performing a histogram generation process corresponding to each color component of RGB (red, green, and blue) may be used.

The feature data generated for the input image data is compared to the feature data pre-generated for the registration image data, similarity therebetween is obtained, and the registration image data having the highest similarity is selected as a search result.

As the search result, in addition to the registration image data having the highest similarity, a predetermined number of pieces of the registration image data having the descending order of similarity may be selected as the search result.

When the search result is outputted by the search section 13, a visualized image of the registration image data selected as the search result is displayed by the display section 14.

As for the registration image data, it is preferable that the image determination process as described above is performed in the registration, and the registration image data along with classification information representing whether the registration image data is document image data or non-document image data is stored in the registration image storing section 15.

When input image data is to be determined, according to the registration image data stored along with the classification information, only the registration image data having the classification same as that of the input image data is used for searching, and not all of the registered data needs to be compared. Therefore, time required for performing the search process can be reduced.

According to the invention, the following advantages are obtained.

By performing the selection of the connected components, unnecessary components can be removed in advance and an amount of calculation for the statistical process can be reduced. Therefore, time required for performing the determination process and the search process can be reduced. In addition, since the connected components that may cause misjudgment are removed in advance, the determination accuracy can be improved.

The respective blocks of the image search apparatus 10, in particular, the input section 11, the image determination section 12, the search section 13, the display section 14, the registration image storing section 15 and the like can be configured by a hardware logic or implemented by a software with the use of a CPU as follows.

In other words, the image search apparatus 10 comprises: a CPU (central processing section) which executes a command of a control program for implementing the respective functions; a ROM (read only memory) which stores the program; a RAM (random access memory) which develops the program; a storage device such as a memory (recording medium) which stores the program and a variety of data, and the like. The object of the invention can be achieved too in such a manner that the recording medium on which the program code of the control program of the image search apparatus 10 which program code is a software which implements the functions as described above (an executable program, intermediate-ode program, and source program) is recorded to be read by a computer is provided to the image search apparatus 10, and the computer (or CPU or MPU) reads and executes the program code recorded on the recording medium.

Examples of the recording medium to be used include tape type media such as a magnetic tape or cassette tape; disk type media including a magnetic disk such as a floppy (registered trade mark) disk or hard disk or an optical disk such as a CD-ROM/MO/MD/DVD/CD-R; card type media such as an IC card (including a memory card)/optical card; and semiconductor memory media such as a mask ROM, EPROM, EEPROM, or flash ROM.

Further, it is possible that the image search apparatus 10 is configured in order to make it connectable to the communication network and providing the program code through a communication. The communication network which is not particularly limited, may be selected, for example, from Internet, intranet, extranet, LAN, ISDN, VAN, CATV communication network, virtual private network, telephone line network, mobile communication network, satellite communication network, and the like. A transmission medium constituting the communication network is not particularly limited, which may be either wired or wireless. The wired medium includes IEEE1394, USB, power-line carrier, cable TV line, telephone line, ADSL line, and the like. The wireless medium includes infrared light used for IrDA or a remote control, Bluetooth (registered trademark), 802.11 wireless network, HDR, a cellular phone network, a satellite connection, digital terrestrial network, and the like. In addition, the present invention can be realized also by using computer data signal embedded in the carrier wave, which is realized by electronic transmission of the aforementioned program codes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image determination apparatus which determines whether inputted image data is document image data or non-document image data, comprising:
   a binarization process section which converts the inputted image data to binary image data by binarizing the inputted image data, and calculates a total black pixel ratio that is a ratio of a number of black pixels to a number of all pixels in the image data;
   a feature extracting section which detects connected components that are groups of pixels having a same color in the binary image data and circumscribing bounding boxes of the connected components, and generates a histogram by specifying the sizes of the circumscribing bounding boxes as classes and numbers of the components as frequencies of occurrence; and
   an image determination section which determines whether the inputted image data is document image data or non-document image data based on information related to the generated histogram and the total black pixel ratio;
   wherein the feature extracting section removes the connected components in the circumscribing bounding boxes of which the sizes are smaller than a predetermined size, from all connected components, further removes the connected components in the circumscribing bounding boxes of which bounding box black pixel ratios are out of a predetermined range, based on the sizes of the circumscribing bounding boxes and bounding box black pixel ratios each of which represents a ratio of the number of the black pixels constituting corresponding connected component in corresponding circumscribing bounding box to the number of all pixels in the corresponding circumscribing bounding box, and generates the histogram by using the remaining connected components.

2. The image determination apparatus of claim 1, wherein when the number of the connected components in the circumscribing bounding boxes which belong to a class representing the smallest size is r1, a ratio of the number r1 of the connected components to the number of all connected components is r2, and the total black pixel ratio is r0, the image determination section calculates a determination feature F by using F=r1×r2/r0 and determines whether the inputted image data is the document image data or the non-document image data based on the determination feature F.

3. An image search apparatus which searches pre-registered image data for image data similar to inputted image data, comprising:
the image determination apparatus of claim 1;
a feature data generating section which generates feature data for document image data when the inputted image data is the document image data and generates feature data for non-document image data when the inputted image data is the non-document image data based on the determination result of the image determination apparatus;
a search section which searches the pre-registered image data for the image data similar to the inputted image data, based on feature data of the pre-registered image data and the feature data generated by the feature data generating section; and
a display section which displays the image data similar to the inputted image data among the pre-registered image data based on a search result of the search section.

4. The image search apparatus of claim 3, wherein the pre-registered image data is classified and registered into the document image data and the non-document image data, and based on a determination result of the image determination apparatus, when the inputted image data is the document image data, the search section sets a search field to the image data registered as the document image data, and when the inputted image data is the non-document image data, the search section sets the search field to the image data registered as the non-document image data.

5. The image search apparatus of claim 3, wherein, responsive to whether the feature data is on or between a first low threshold value and a second high threshold value, the input image data is either outputted or not outputted to the search section.

6. A non-transitory computer-readable recording medium on which an image search program is recorded in order to make a computer function as the image search apparatus of claim 3.

7. An image determination apparatus which determines whether inputted image data is document image data or non-document image data, comprising:
a binarization process section which converts the inputted image data to binary image data by binarizing the inputted image data, and calculates a total black pixel ratio that is a ratio of a number of black pixels to a number of all pixels in the image data;
a feature extracting section which detects connected components that are groups of pixels having a same color in the binary image data and circumscribing bounding boxes of the connected components, and generates a histogram by specifying the sizes of the circumscribing bounding boxes as classes and numbers of the connected components as frequencies of occurrence; and
an image determination section which determines whether the inputted image data is document image data or non-document image data based on information related to the histogram and the total black pixel ratio;
wherein the feature extracting section removes, from all connected components, the connected components in the circumscribing bounding boxes which are of a smaller size than a predetermined size, based on the sizes of the circumscribing bounding boxes and bounding box black pixel ratios each of which represents a ratio of the number of the black pixels constituting corresponding connected component in corresponding circumscribing bounding box to the number of all pixels in the corresponding circumscribing bounding box, and generates the histogram using the remaining connected components.

8. An image search apparatus which searches pre-registered image data for image data similar to inputted image data, comprising:
the image determination apparatus of claim 7;
a feature data generating section which generates feature data for document image data when the inputted image data is the document image data and generates feature data for non-document image data when the inputted image data is the non-document image data based on the determination result of the image determination apparatus;
a search section which searches the pre-registered image data for the image data similar to the inputted image data, based on feature data of the pre-registered image data and the feature data generated by the feature data generating section; and
a display section which displays the image data similar to the inputted image data among the pre-registered image data based on a search result of the search section.

9. An image determination apparatus which determines whether inputted image data is document image data or non-document image data, comprising:
a binarization process section which converts the inputted image data to binary image data by binarizing the inputted image data, and calculates a total black pixel ratio that is a ratio of a number of black pixels to a number of all pixels in the image data;
a feature extracting section which detects connected components that are groups of pixels having a same color in the binary image data and circumscribing bounding boxes of the connected components, and generates a histogram by specifying the sizes of the circumscribing bounding boxes as classes and numbers of the components as frequencies of occurrence; and
an image determination section which determines whether the inputted image data is document image data or non-document image data based on information related to the histogram and the total black pixel ratio;
wherein the feature extracting section, removes from all connected components, the connected components in the circumscribing bounding boxes of which bounding box black pixel ratios are out of a predetermined range, based on the sizes of the circumscribing bounding boxes and bounding box black pixel ratios each of which represents a ratio of the number of the black pixels constituting corresponding connected component in corresponding circumscribing bounding box to the number of all pixels in the corresponding circumscribing bounding box, and generates the histogram by using the remaining connected components.

10. An image search apparatus which searches pre-registered image data for image data similar to inputted image data, comprising:

the image determination apparatus of claim 9;

a feature data generating section which generates feature data for document image data when the inputted image data is the document image data and generates feature data for non-document image data when the inputted image data is the non-document image data based on the determination result of the image determination apparatus;

a search section which searches the pre-registered image data for the image data similar to the inputted image data, based on feature data of the pre-registered image data and the feature data generated by the feature data generating section; and a display section which displays the image data similar to the inputted image data among the pre-registered image data based on a search result of the search section.

* * * * *